United States Patent
Song et al.

(10) Patent No.: US 9,729,795 B2
(45) Date of Patent: Aug. 8, 2017

(54) MOBILE TERMINAL AND METHOD FOR CONTROLLING THE SAME

(71) Applicant: LG ELECTRONICS INC., Seoul (KR)

(72) Inventors: Yoomee Song, Seoul (KR); Arim Kwon, Seoul (KR); Hyungsun Kim, Seoul (KR); Cheongha Park, Seoul (KR); Sangwoon Lee, Seoul (KR); Jungmin Park, Seoul (KR); Hyerim Ku, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/964,313

(22) Filed: Dec. 9, 2015

(65) Prior Publication Data

US 2017/0034444 A1     Feb. 2, 2017

(30) Foreign Application Priority Data

Jul. 27, 2015    (KR) ........................ 10-2015-0106046

(51) Int. Cl.
| | |
|---|---|
| H04N 5/232 | (2006.01) |
| G06F 3/048 | (2013.01) |
| H04N 5/262 | (2006.01) |
| H04N 5/77 | (2006.01) |
| G06F 3/0484 | (2013.01) |
| G06F 3/0488 | (2013.01) |

(52) U.S. Cl.
CPC ....... *H04N 5/23293* (2013.01); *G06F 3/0488* (2013.01); *G06F 3/04842* (2013.01); *H04N 5/232* (2013.01); *H04N 5/2628* (2013.01); *H04N 5/772* (2013.01)

(58) Field of Classification Search
None
See application file for complete search history.

(56) References Cited

U.S. PATENT DOCUMENTS

| | | | |
|---|---|---|---|
| 2009/0322893 A1 | 12/2009 | Stallings et al. | |
| 2011/0058087 A1 | 3/2011 | Ito et al. | |
| 2012/0105676 A1 | 5/2012 | Park | |
| 2012/0306925 A1* | 12/2012 | Hwang | ................ G06F 3/0488 345/647 |
| 2013/0155308 A1 | 6/2013 | Wu et al. | |
| 2013/0177287 A1* | 7/2013 | Nakashima | .............. H04N 9/87 386/224 |
| 2014/0146212 A1 | 5/2014 | Jung et al. | |

(Continued)

FOREIGN PATENT DOCUMENTS

| | | |
|---|---|---|
| CN | 101459769 A | 6/2009 |
| EP | 2811737 A2 | 12/2014 |

(Continued)

*Primary Examiner* — Timothy J Henn
(74) *Attorney, Agent, or Firm* — Birch, Stewart, Kolasch & Birch, LLP

(57) ABSTRACT

A mobile terminal including a camera; a display capable of display an image captured by the camera in real-time; and a controller capable of display a plurality of frames generated using images captured continuously since a start of the image capturing, and execute a function on the mobile terminal associated with one or more of the generated frames while the camera captures the image.

16 Claims, 18 Drawing Sheets

(56) References Cited

U.S. PATENT DOCUMENTS

| | | | |
|---|---|---|---|
| 2014/0355960 A1* | 12/2014 | Paulus | H04N 9/79 386/282 |
| 2014/0365893 A1* | 12/2014 | Gao | G06F 3/0488 715/719 |
| 2014/0380380 A1* | 12/2014 | Heller | H04N 21/47217 725/58 |
| 2015/0082168 A1* | 3/2015 | Brieussel | G06F 3/0481 715/716 |
| 2015/0106712 A1* | 4/2015 | Oh | G11B 27/034 715/716 |
| 2015/0220249 A1* | 8/2015 | Snibbe | G06F 3/0412 715/719 |
| 2015/0256763 A1* | 9/2015 | Niemi | G06F 3/0485 348/700 |
| 2016/0103574 A1* | 4/2016 | Kankaanp | G06F 3/0484 715/720 |
| 2016/0179355 A1* | 6/2016 | K S | G06F 3/04847 715/771 |
| 2016/0180882 A1* | 6/2016 | Kimura | G11B 27/34 386/282 |
| 2016/0216871 A1* | 7/2016 | Stamatiou | G06F 3/04845 |
| 2016/0342301 A1* | 11/2016 | Kato | G06F 3/0416 |

FOREIGN PATENT DOCUMENTS

| | | |
|---|---|---|
| WO | 2008/032721 A1 | 3/2008 |
| WO | WO 2013/101211 A | 7/2013 |

\* cited by examiner

MOBILE TERMINAL AND METHOD FOR CONTROLLING THE SAME

CROSS-REFERENCE TO RELATED APPLICATION

Pursuant to 35 U.S.C. §119(a), this application claims the benefit of earlier filing date and right of priority to Korean Application No. 10-2015-0106046, filed on Jul. 27, 2015, the contents of which is incorporated by reference herein in its entirety.

BACKGROUND OF THE INVENTION

1. Field of the Invention

The present invention relates to a mobile terminal that executes a function associated with a previously captured image while a camera captures an image, and a method for controlling the same.

2. Background of the Invention

Terminals may be generally classified as mobile/portable terminals or stationary terminals. Mobile terminals may also be classified as handheld terminals or vehicle mounted terminals. Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been capable of receive broadcast and multicast signals which permit viewing of content such as videos and television programs.

Efforts are ongoing to support and increase the functionality of mobile terminals. Such efforts include software and hardware improvements, as well as changes and improvements in the structural components. Recently, the needs for a new user interface for controlling a terminal while an image is captured using a camera built in the terminal have increased.

SUMMARY OF THE INVENTION

Therefore, an aspect of the detailed description is to provide a mobile terminal that executes a function associated with a previously captured image while a camera captures an image, and a method for controlling the same.

Another aspect of the detailed description is to provide a mobile terminal that sets at least some of previously captured images to be played back in fast motion or slow motion while the camera captures an image, and a method for controlling the same.

Still another aspect of the detailed description is to provide a mobile terminal that executes a function associated with some images satisfying the predetermined condition among the previously captured images, and a method for controlling the same.

Yet another aspect of the detailed description is to provide a mobile terminal that provides approximate information regarding the previously captured images in real-time while the camera captures the image, and a method for controlling the same.

To achieve these and other advantages and in accordance with the purpose of this specification, as embodied and broadly described herein, there is provided a mobile terminal comprising a camera, a display capable of display an image captured by the camera in real-time and a controller capable of display a plurality of frames generated using images captured continuously since a start of the image capturing, and execute a function on the mobile terminal associated with one or more of the generated frames while the camera captures the image.

There is also provided a method of controlling a mobile terminal, the method comprising displaying, via a display of the mobile terminal, an image captured by a camera in real-time, displaying a plurality of frames on the display generated using images captured continuously since a start of the image capturing, and executing, via a controller of the mobile terminal, a function on the mobile terminal associated with one or more of the generated frames while the camera captures the image.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like. By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
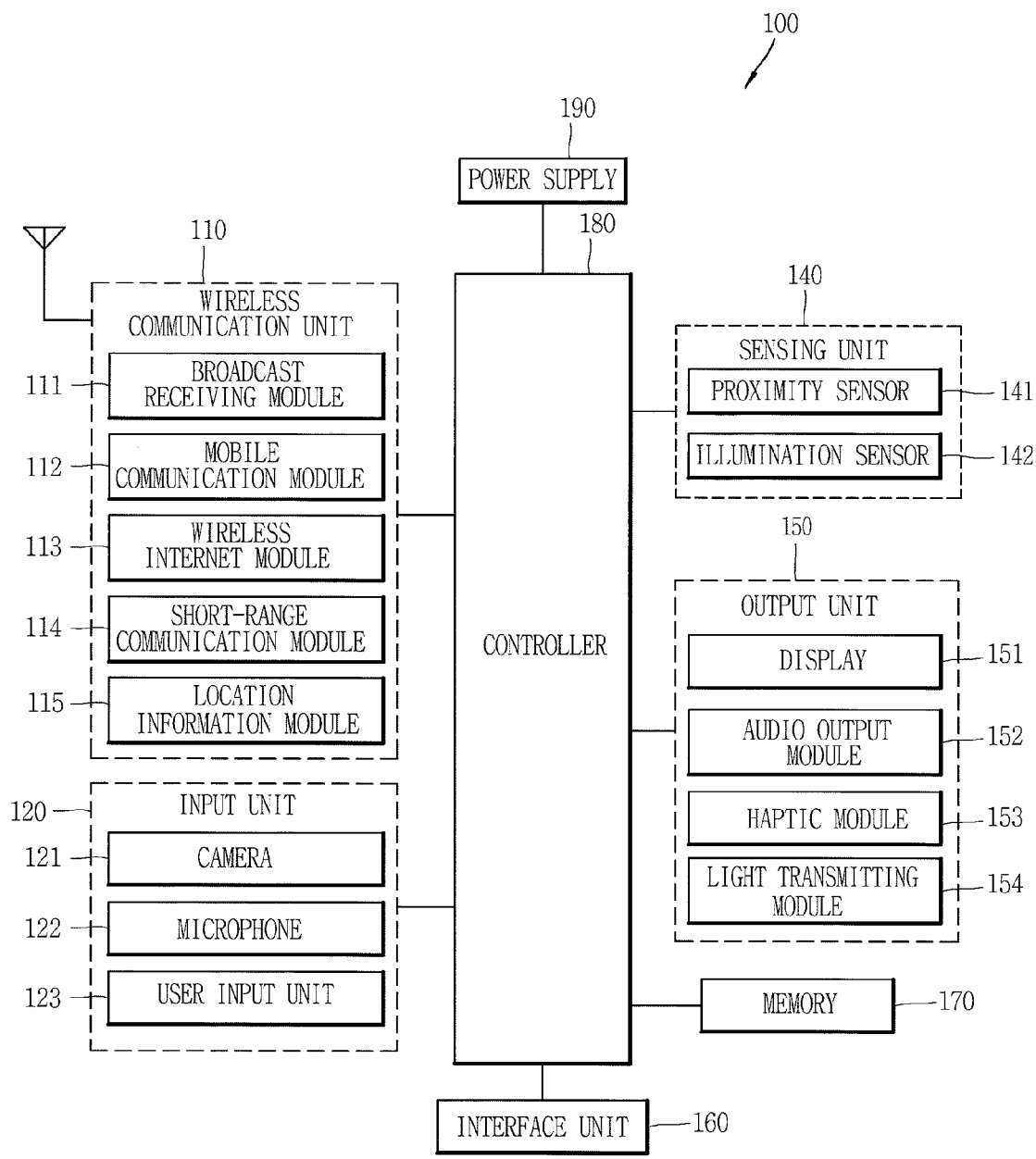
FIG. 1A is a block diagram illustrating a mobile terminal associated with the present invention.
Figure 1B:
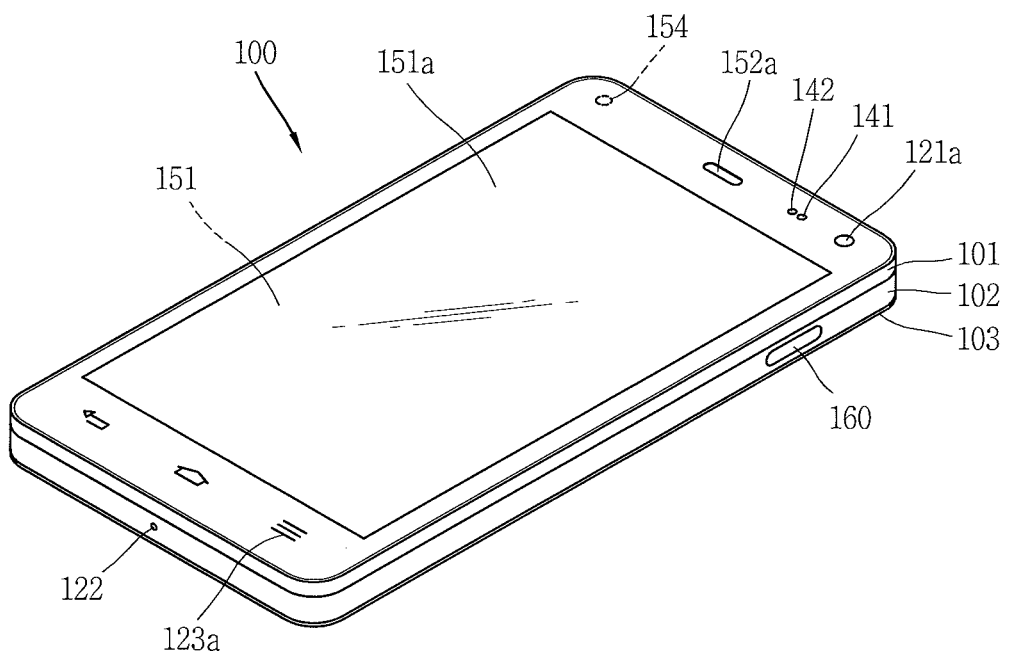
FIGS. 1B to 1D are conceptual diagrams showing an example of a mobile terminal associated with the present invention, which is seen in different directions.
Figure 1C:
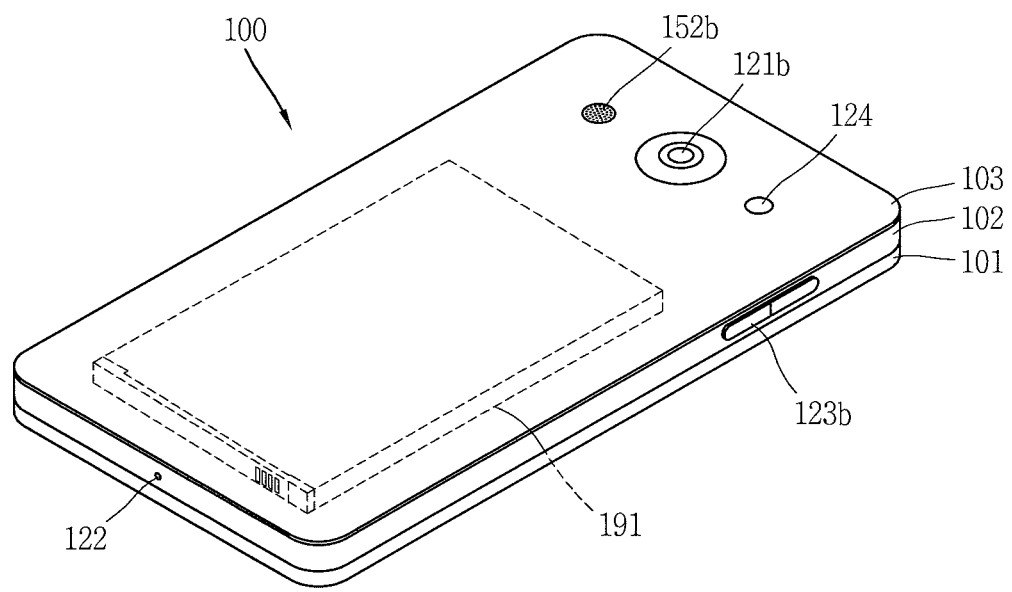

Reference is now made to FIGS. 1A-1D, where FIG. 1A is a block diagram of a mobile terminal in accordance with the present disclosure, and FIGS. 1B and 1C are conceptual views of one example of the mobile terminal, viewed from different directions. The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors capable of sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be capable of utilize information obtained from sensing unit 140, and in particular, information obtained from one or more sensors of the sensing unit 140, and combinations thereof.

The output unit 150 is typically capable of output various types of information, such as audio, video, tactile output, and the like. The output unit 150 is shown having a display 151, an audio output module 152, a haptic module 153, and an optical output module 154. The display 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be capable of store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1D according to the execution of an application program that have been stored in the memory 170.

The power supply unit 190 can be capable of receive external power or provide internal power in order to supply appropriate power required for operating elements and components included in the mobile terminal 100. The power supply unit 190 may include a battery, and the battery may be capable of be embedded in the terminal body, or capable of be detachable from the terminal body.

Referring still to FIG. 1A, various components depicted in this figure will now be described in more detail. Regarding the wireless communication unit 110, the broadcast receiving module 111 is typically capable of receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is capable of facilitate wireless Internet access. This module may be internally or externally coupled to the mobile terminal 100. The wireless Internet module 113 may transmit and/or receive wireless signals via communication networks according to wireless Internet technologies. Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is capable of facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

The location information module 115 is generally capable of detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be capable of permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally capable of sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display 151, using any of a variety of touch methods. Examples of such touch methods include a resistive type, a capacitive type, an infrared type, and a magnetic field type, among others.

As one example, the touch sensor may be capable of convert changes of pressure applied to a specific part of the display 151, or convert capacitance occurring at a specific part of the display 151, into electric input signals. The touch sensor may also be capable of sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like. If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be capable of scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display 151 is generally capable of output information processed in the mobile terminal 100. For example, the display 151 may display execution screen information of an application program executing at the mobile terminal 100 or user interface (UI) and graphic user interface (GUI) information in response to the execution screen information. In some embodiments, the display 151 may be implemented as a stereoscopic display for displaying stereoscopic images. A typical stereoscopic display may employ a stereoscopic display scheme such as a stereoscopic scheme (a glass scheme), an auto-stereoscopic scheme (glassless scheme), a projection scheme (holographic scheme), or the like.

The audio output module 152 is generally capable of output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be capable of generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or aim, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen. The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition. The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected. As another example, the power supply unit 190 may be capable of recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display 151 is shown located on the front side of the terminal body to output information. As illustrated, a window 151a of the display 151 may be mounted to the front case 101 to form the front surface of the terminal body together with the front case 101. In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display 151 outputs information processed in the mobile terminal 100. The display 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display 151 may be implemented using two display devices, which can implement the same or different display technology. For instance, a plurality of the displays 151 may be arranged on one side, either spaced apart from each other, or these devices may be integrated, or these devices may be arranged on different surfaces.

The display 151 may also include a touch sensor which senses a touch input received at the display. When a touch is input to the display 151, the touch sensor may be capable of sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like. The window 151a of the display 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be capable of output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display 151 or stored in the memory 170. The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display 151, and the like. The rear input unit may be capable of permit touch input, a push input, or combinations thereof.

The rear input unit may be located to overlap the display 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display 151 can have a larger screen. As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display 151 to extend the function of the mobile terminal 100. Another example of the accessory is a touch pen for assisting or extending a touch input to a touch screen.

Figure 1D:
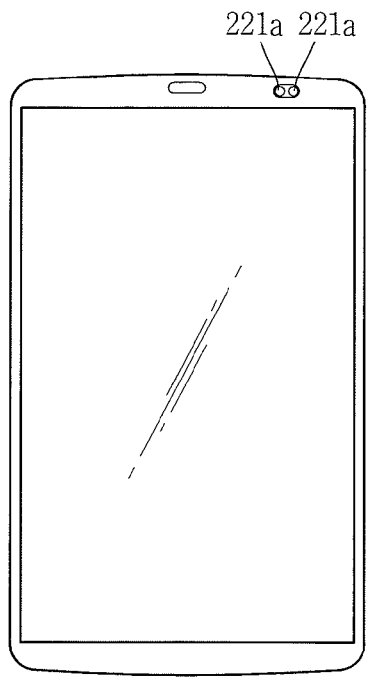

FIG. 1D is a view showing a front surface of a mobile terminal according to an embodiment of the present invention. The mobile terminal according to an embodiment of the present invention may be equipped with at least two cameras capable of capture images at different angles of view. The angle of view is a capture range of a lens installed in a camera. In this instance, as the angle of view increases, the camera may capture a wider range of image.

As the angle of view increases, the focal length of the lens of the camera may decrease. Accordingly, when an image is captured using a lens having a large angle of view, the camera may capture a wide range of image. However, in the wide range of image, an image distortion effect may be increased by the angle of view to exaggerate perspective.

The lens may be divided into a wide-angle lens, a standard lens, and a telephoto lens according to the angle of view. The standard lens is a lens having an angle of view of 45 degrees and a focal length of 50 mm. Based on the standard lens, a lens having an angle of view greater than 45 degrees may be identified as the wide-angle lens, and a lens having an angle of view less than 45 degrees may be identified as the telephoto lens.

The mobile terminal may be equipped with at least two cameras positioned on a front surface, a side surface, and a rear of a main body and capable of capture images at different angles of view. For example, as shown in FIG. 1D, two cameras 221a and 221b having different angles of view may be disposed on the front surface of the main body of the mobile terminal and adjacent to each other. In this instance, the two cameras 221a and 221b having different angles of view may have the same capture direction.

Alternatively, according to an embodiment of the present invention, the two cameras having different angles of view may be disposed on the rear or side surface of the main body instead of the front surface of the main body. Alternatively, at least two cameras may be disposed on different surfaces among the front surface, the side surface, and the rear surface to have different capture directions.

Figure 2:
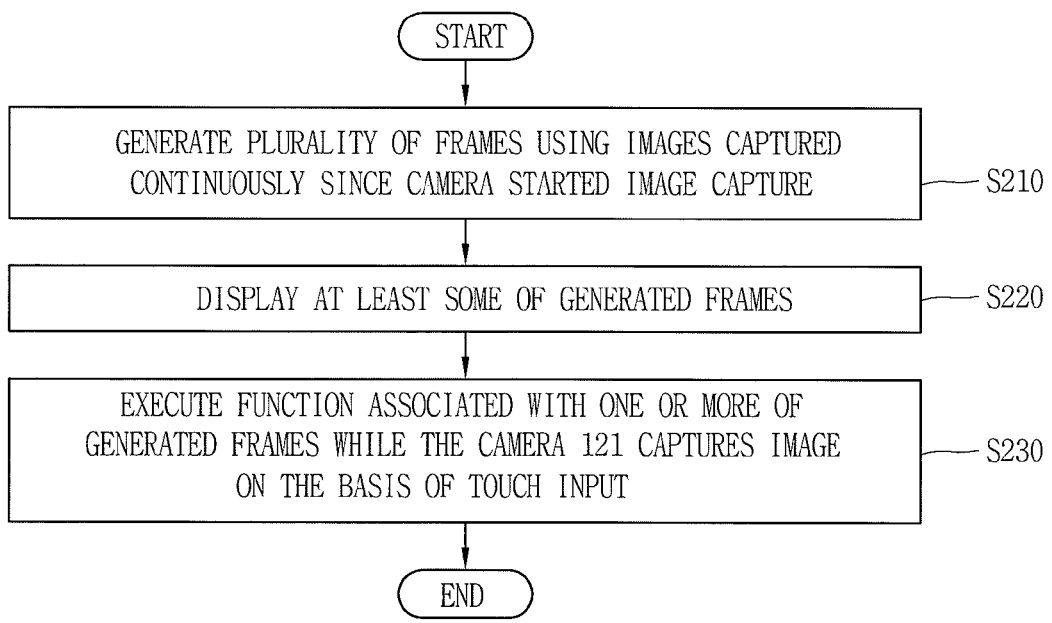
FIG. 2 is a flowchart showing a method for controlling a mobile terminal according to an embodiment of the present invention.
Figure 3:
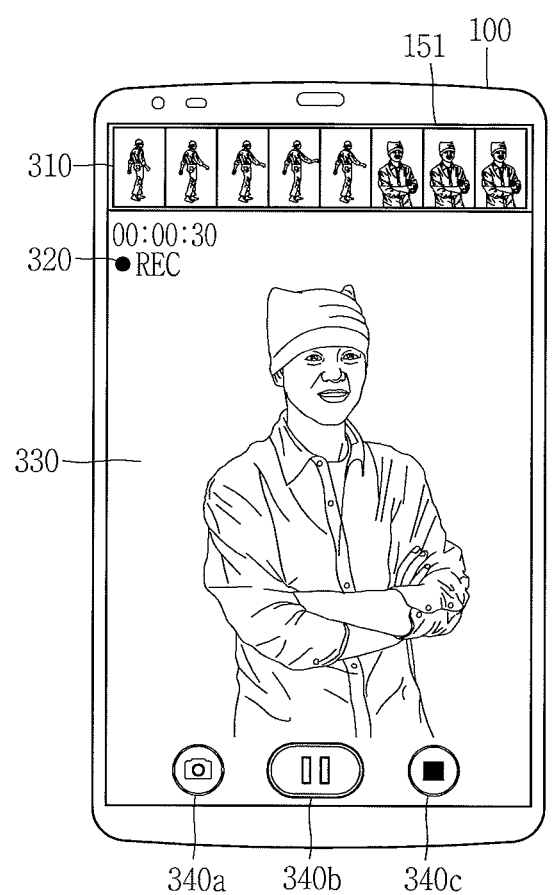
FIG. 3 is a conceptual view showing an image capture screen of a mobile terminal according to an embodiment of the present invention.

Next, FIG. 2 is a flowchart showing a method for controlling a mobile terminal according to an embodiment of the present invention, and FIG. 3 is a conceptual view showing an image capture screen of a mobile terminal according to an embodiment of the present invention.

First, the controller 180 generates a plurality of frames using images continuously captured by a camera 121 from a start time of the image capture (S210). When the camera 121 starts image capture, the controller 180 uses continuously captured images to generate a predetermined number of frames per unit time. The number of frames generated by the controller 180 per unit time varies depending on the number of frames captured by the camera 121 per unit time. That is, the number of frames generated by the controller 180 per unit time varies depending on the number of frames per second (FPS) of the camera 121.

A mobile terminal according to an embodiment of the present invention can provide approximate information regarding an image captured through the camera 121, allowing a user to freely edit the previously captured image using the provided information while the user captures an image. Thus, the controller 180 controls a display 151 to display at least some of the generated frames (S220).

As shown in FIG. 3, while the camera 121 captures an image, a frame display region 310, a capture time 320, a real-time image 330 captured by the camera 121, and graphic objects 340a to 340c associated with the image capture are displayed on the display 151. The controller 180 controls the display 151 to display at least some of the generated frames in order to inform about information regarding images captured since the image capture was started. In more detail, as shown in FIG. 3, at least some of the generated frames are displayed in the frame display region 310.

The controller 180 can enumerate frames generated at predetermined intervals in the frame display region 310 in the order in which the frames are generated. The order in which the frames are displayed in the frame display region 310 may be changed based on a user input. The user can check approximate information regarding previously captured images using the frame display region 310.

As the capture time increases, the number of frames displayed on the display 151 may increase. Thus, the space for displaying the frames may be insufficient in the frame display region 310. In this instance, the controller 180 can preferentially display recently generated frames and removes previously displayed frames. The user can check the removed frames through scrolling.

Next, the controller 180 executes a function associated with one or more of the generated frames while the camera 121 captures an image based on a touch input (S230). The controller 180 can select one or more frames from among the generated frames. The controller 180 can select one or more frames in the following two ways.

First, the controller 180 can select one or more frames based on a touch input applied to frames displayed in the frame display region 310. Second, the controller 180 can select one or more frames satisfied with a predetermined condition. For example, the controller 180 can select one or more frames in which a face is recognized from among the generated frames.

The controller 180 can execute a function associated with the selected one or more frames. The function is associated with a previously captured image and will be described in detail in the following embodiments. The function may be executed while the camera 121 captures an image. That is, the user can execute the function associated with the previously captured image while capturing an image with the camera 121. As discussed above, the mobile terminal according to an embodiment of the present invention can execute the function associated with the previously captured image even while the camera captures an image. An embodiment of the present invention may be discussed in detail below.

Figure 4A:
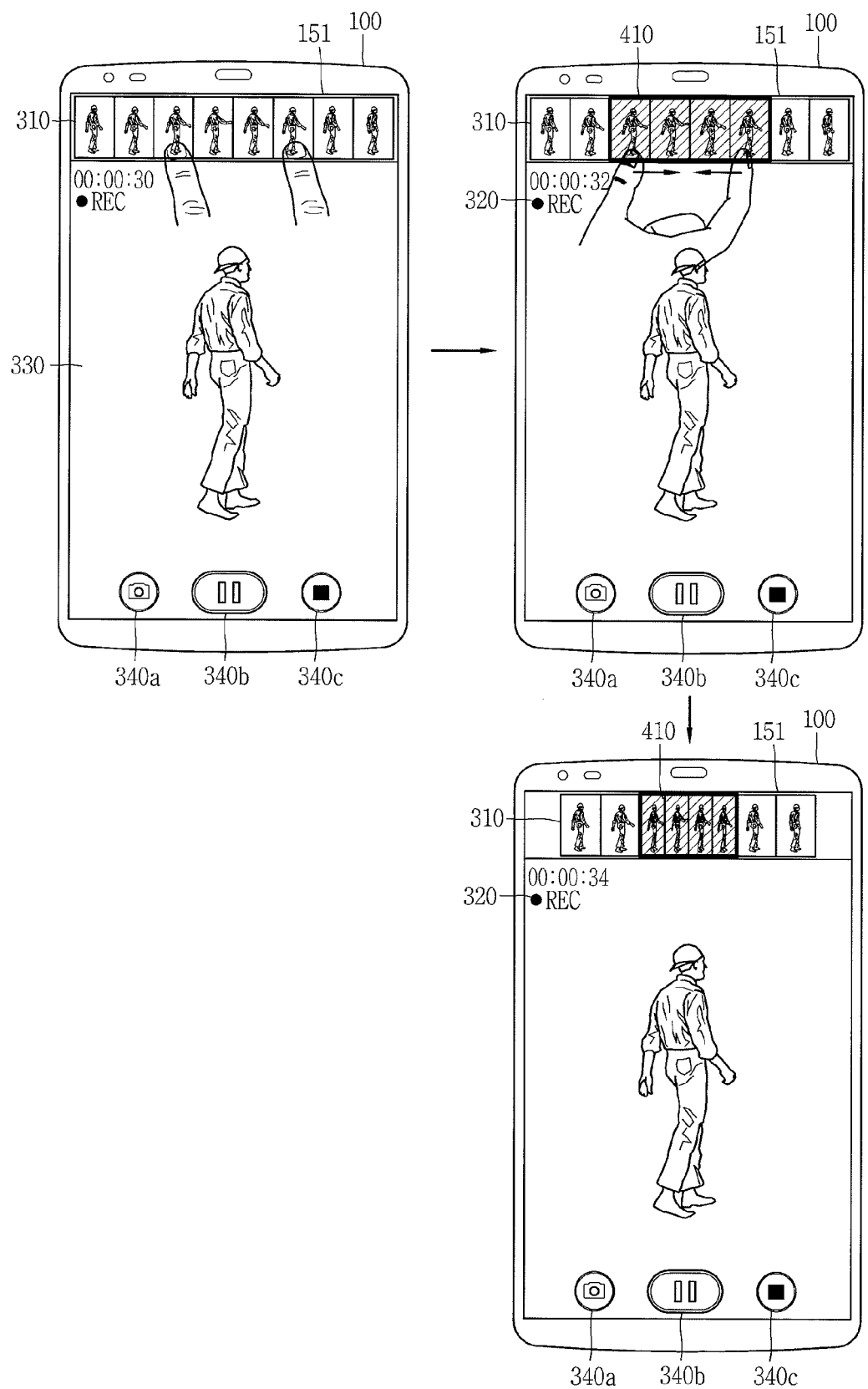
FIGS. 4A and 4B are conceptual views showing an example of executing a function associated with a playback rate of a previously captured image.
Figure 4B:
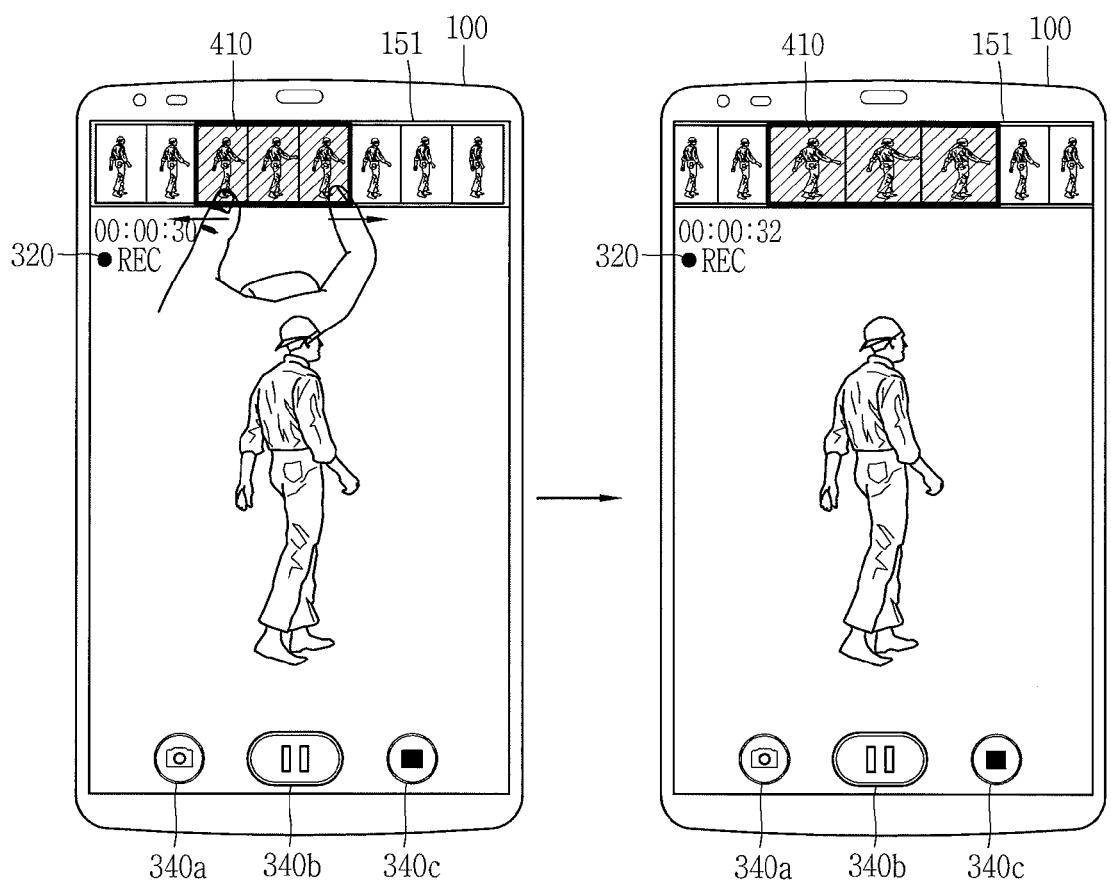

FIGS. 4A and 4B are conceptual views showing an example of executing a function associated with a playback rate of a previously captured image. The controller 180 uses the generated frames to generate a video in which the frames are output at a first frame rate. The controller 180 can use an image captured by the camera 121 to generate a plurality of frames and generate a video in which the generated frames are output at a predetermined rate. The controller 180 can change a playback rate for at least some sections of the video while the camera 121 captures an image.

The frame rate is the number of frames that are output in the video per unit time. The first frame rate may be predetermined by a user input and may be the same as the number of frames generated by the control units 180 per unit time. That is, the first frame rate may be a rate at which the image captured through the camera 121 is output without any change.

The controller 180 can set a frame rate of at least some sections of the generated video to be different while the camera 121 captures an image. Thus, when a predetermined touch input is applied while the camera 121 captures an image, the controller 180 can select one or more frames and set a frame rate of the selected frames to a second frame rate different from the first frame rate based on the predetermined touch input.

Thus, a portion of the video is output at the first frame rate, another portion of the video is output at the second frame rate. The predetermined touch input may be a touch input to the displayed frames. In more detail, when the controller 180 senses a touch, the controller 180 selects one or more frames from among the created frames based on at least one frame located in a region in which the touch is applied.

For example, as shown in the first figure of FIG. 4A, first and second touches may be applied to first and second frames among the displayed frames. The controller 180 selects frames including the first and second frames among the generated frames. In addition, when a long touch is applied to any one of the frames displayed on the frame display region 310, the controller 180 controls the display 150 to enlarge the frame to which the long touch is applied. When a touch is applied to the enlarged frame, the controller 180 selects one or more frames based on the enlarged frame. Thus, a user can select the frames after checking detailed information regarding a previously captured image.

The controller 180 sets the selected frames to a second rate based on the predetermined touch input. The second frame rate may vary depending on the predetermined touch input. For example, when a distance between a first touch and a second touch is changed, the controller 180 can set the frame rate of the selected frames based on the change in distance. In more detail, as shown in the second figure of FIG. 4A, when the distance between the first touch and the second touch decreases, the controller 180 can set the second frame rate to be greater than the first frame rate. That is, the controller 180 can generate a video in which the selected frames are output at a higher rate than other frames.

When the controller 180 displays frames on the display 151, the controller 180 separates frames having different frame rates from each other. In more detail, some of the frames having different frame rates are displayed on the display 151. The controller 180 highlights at least one frame having a different frame rate among the frames displayed on the display 151 to inform about the frames having different frame rates.

For example, as shown in the third figure of FIG. 4A, the controller 180 displays the first frame, the second frame, and frames positioned between the first frame and the second frame in a smaller size than those of other frames and thus informs about that a frame rate of some of the generated frames is set to be greater than the first frame rate.

As another example, as shown in FIG. 4B, when the distance between the first touch and the second touch increases, the controller 180 can set the second frame rate to be smaller than the first frame rate. That is, the controller 180 can generate a video in which the selected frames are output at a slower rate than other frames. In addition, the controller 180 controls the display to display frames positioned between the first frame and the second frame in a larger size than those of other frames.

Thus, while the camera 121 captures an image, the user can change a playback rate of at least some of previously captured images and check a result of the change in playback rate through frames displayed on the display 151. As described above, a mobile terminal according to an embodiment of the present invention can generate a video using the previously captured image while the camera 121 captures an image and change a frame rate for some sections of the video based on a predetermined touch input.

Figure 5A:
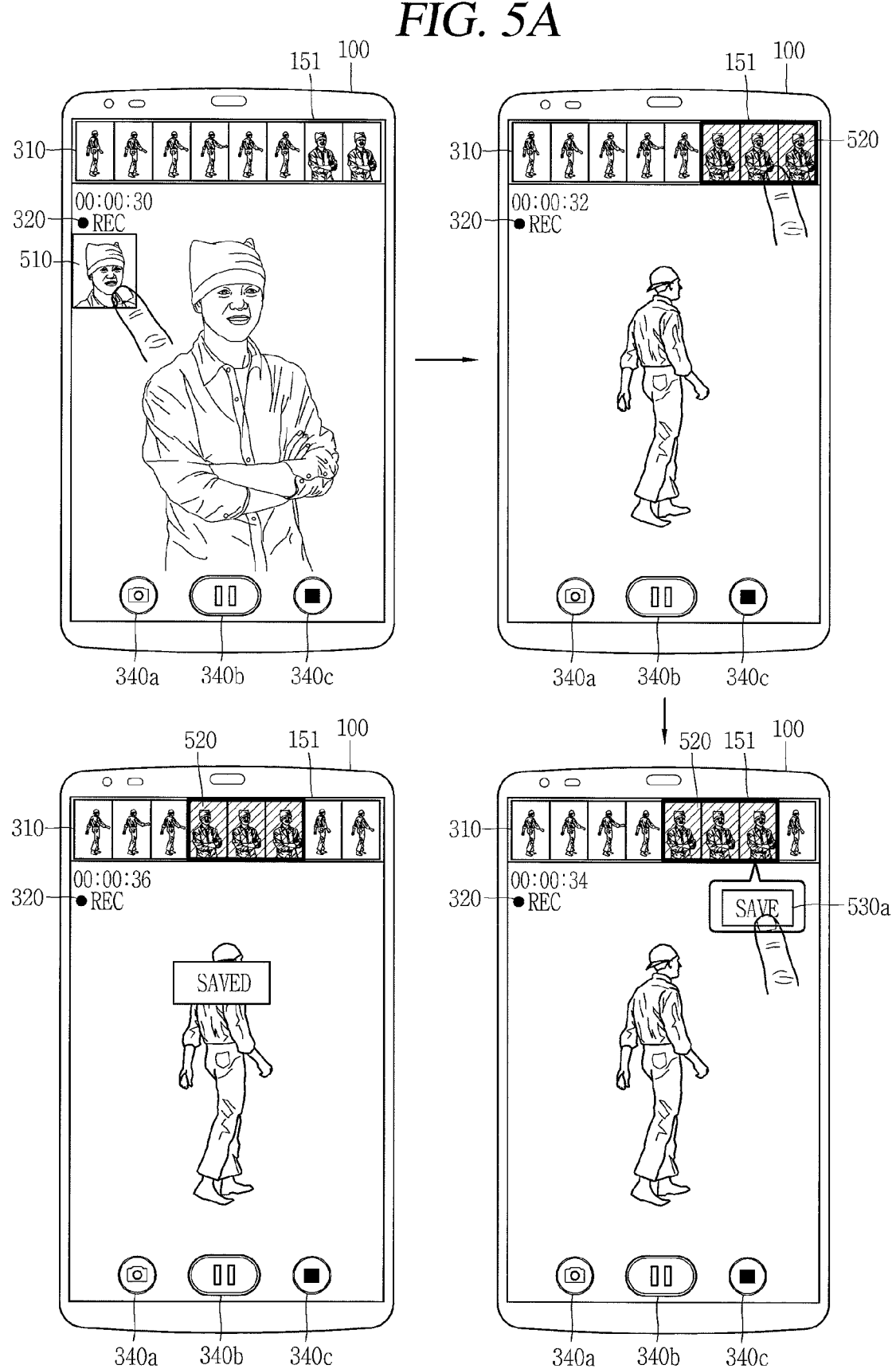
FIGS. 5A and 5B are conceptual views showing an example of generating a separate sub video using some of previously captured images and executing a function associated with the generated sub video while a camera captures an image.
Figure 5B:
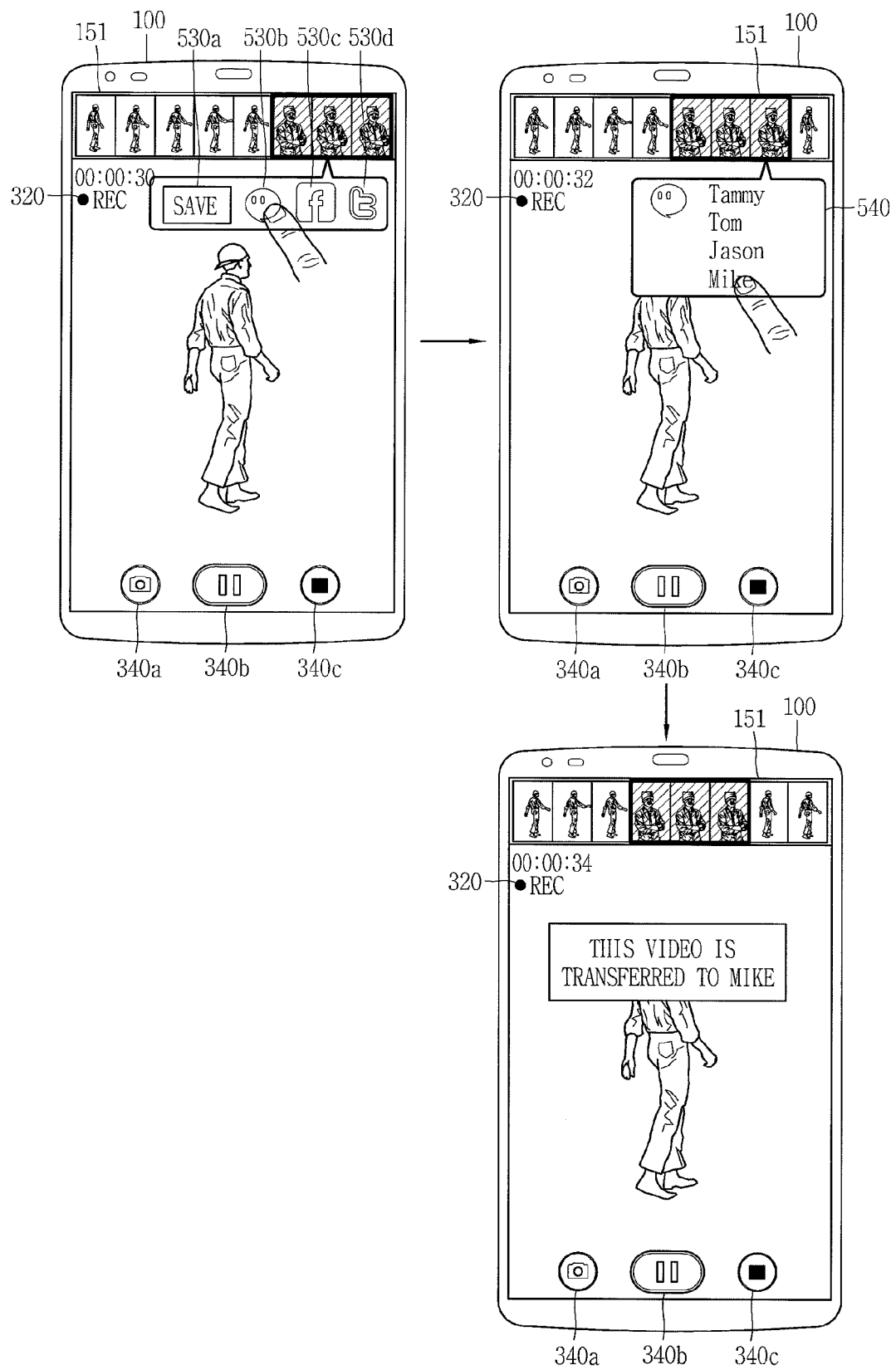

An example of generating a separate sub video using some of the previously captured images and executing a function associated with the generated sub video while the camera 121 captures a video will be discussed in detail below. In particular, FIGS. 5A and 5B are conceptual views showing an example of creating a separate sub video using some of previously captured images and executing a function associated with the created sub video while a camera captures an image.

The controller 180 uses the created frames to create a main video. The main video is a video including all of the generated frames and can be saved in a mobile terminal when the camera 121 finishes capturing the image. The controller 180 can generate a sub video using some of the generated frames, independently of the main video.

Thus, the controller 180 selects one or more frames satisfying a predetermined condition from among the generated frames. The frame satisfying the predetermined condition may be a frame in which a predetermined face is recognized, a frame in which a predetermined subject is included, a frame in which a voice is recorded, a frame with similarity to a predetermined picture being equal to or greater than a reference ratio, etc. In addition, the predetermined condition may be set and changed by a user input. Thus, a user can select a desired part from the previously captured image without checking the previously captured image.

The controller 180 automatically selects one or more frames satisfying the predetermined condition and highlights the selected frames to distinguish the highlighted frames from other frames. In this instance, the controller 180 highlights at least one frame displayed on the display 151 among the one or more frames. Thus, the user can check the frame satisfying the predetermined condition.

The controller 180 generates a sub video using the one or more frames satisfying the predetermined condition, independently of the main video. In more detail, when a user input is applied while at least one frame is highlighted among the frames displayed on the display 151, the controller 180 generates a sub video including the one or more frames.

For example, as shown in the first figure of FIG. 5A, when a face is recognized from frames generated while the camera 121 captures an image, the controller 180 displays a thumbnail image 510 including the recognized face in a region of the display 151. Thus, the user can check the recognized face from the previously captured image.

The controller 180 can select one or more frames including the recognized face based on a touch input applied to the thumbnail image 510. In addition, the controller 180 highlights the frames including the recognized face among the frames displayed on the display 151. For example, as shown in the second figure of FIG. 5A, the frames including the recognized face are highlighted.

The controller 180 generates a sub video based on a touch input applied to the highlighted frames, independently of the main video. For example, as shown in the third figure of FIG. 5A, the controller 180 outputs a graphic object 530a for saving the sub video based on the touch input applied to the highlighted frames.

When a touch input is applied to the graphic object 530a for saving the sub video, the controller 180 saves the sub video including the one or more frames. The controller 180 continuously generates new frames and displays at least some of the generated frames in the frame display region 310 even while the controller 180 saves the sub video. For example, as shown in the frame display region 310 of FIG. 5A, as a capture time proceeds, the new frames are continuously displayed in the frame display region 310.

The controller 180 can transmit the generated sub video to another terminal. In more detail, as shown in FIG. 5A, the controller 180 outputs the graphic object 530a for saving the sub video to the display 151 based on a touch input applied to the highlighted frames. In addition, as shown in the first figure of FIG. 5B, the controller 180 outputs graphic objects 530b to 530d associated with an application to the display 151.

When a touch input is applied to any one of the graphic objects associated with the application, as shown in the second figure of FIG. 5B, the controller 180 outputs another user list registered in an application associated with the graphic object to the display 151. As shown in the second and third figure of FIG. 5B, the controller 180 transmits the sub video to another terminal based on a touch input to the list.

In addition, the sub video may be uploaded to a server selected based on the user input. Thus, the user can separately save and transmit at least some of previously captured images to another terminal only using a simple user input. An example of executing a function associated with some of the previously captured images while the camera 121 captures an image will be discussed below. In particular, FIGS. 6A to 6C are conceptual views showing an example of executing a function associated with some of previously captured images while a camera captures an image.

The controller 180 can edit a previously captured image while a camera captures an image. For example, the controller 180 deletes one or more frames from the created frames. Thus, when the controller 180 generates a video using the generated frames, the controller 180 can generate the video without one or more frames among the generated frames. In more detail, as shown in the first figure of FIG. 6A, when a flicking input that moves down is applied to some highlighted frames among the frames displayed on the display 151, the one or more frames are deleted.

Figure 6A:
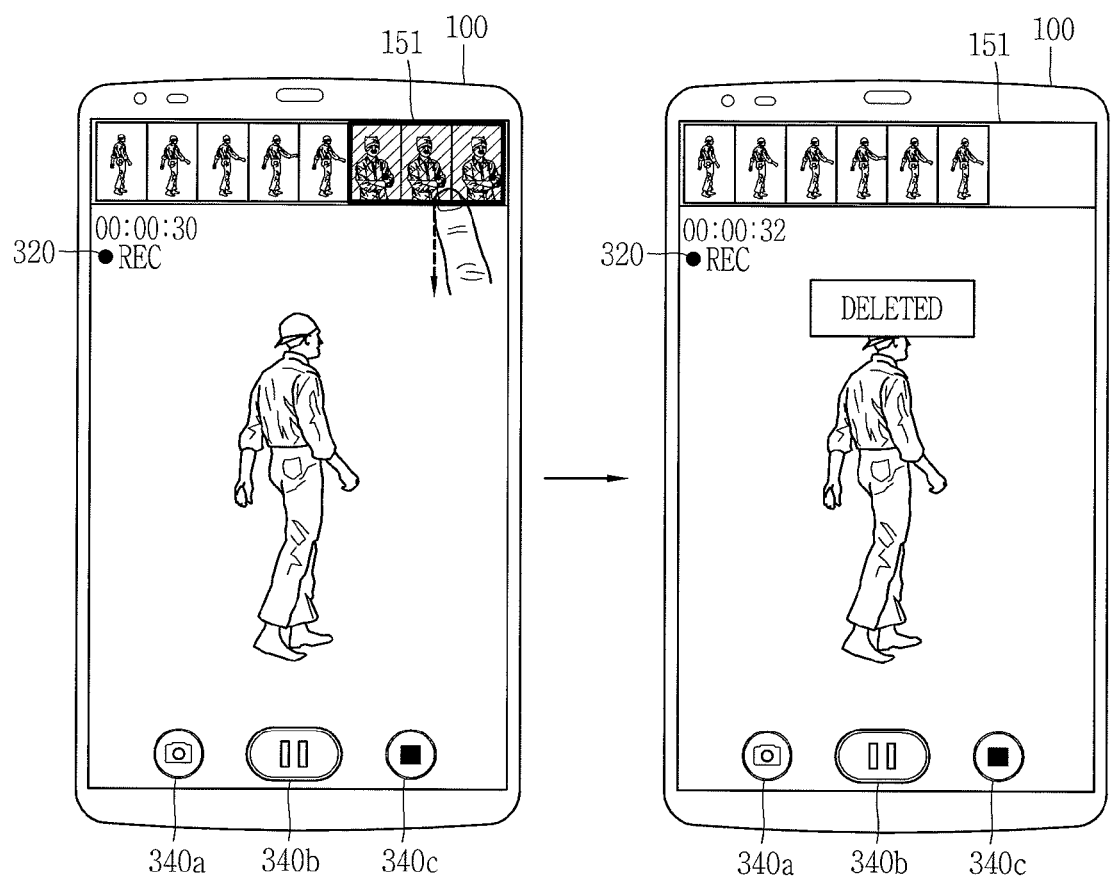
FIGS. 6A to 6C are conceptual views showing an example of executing a function associated with some of previously captured images while a camera captures an image.
Figure 6B:
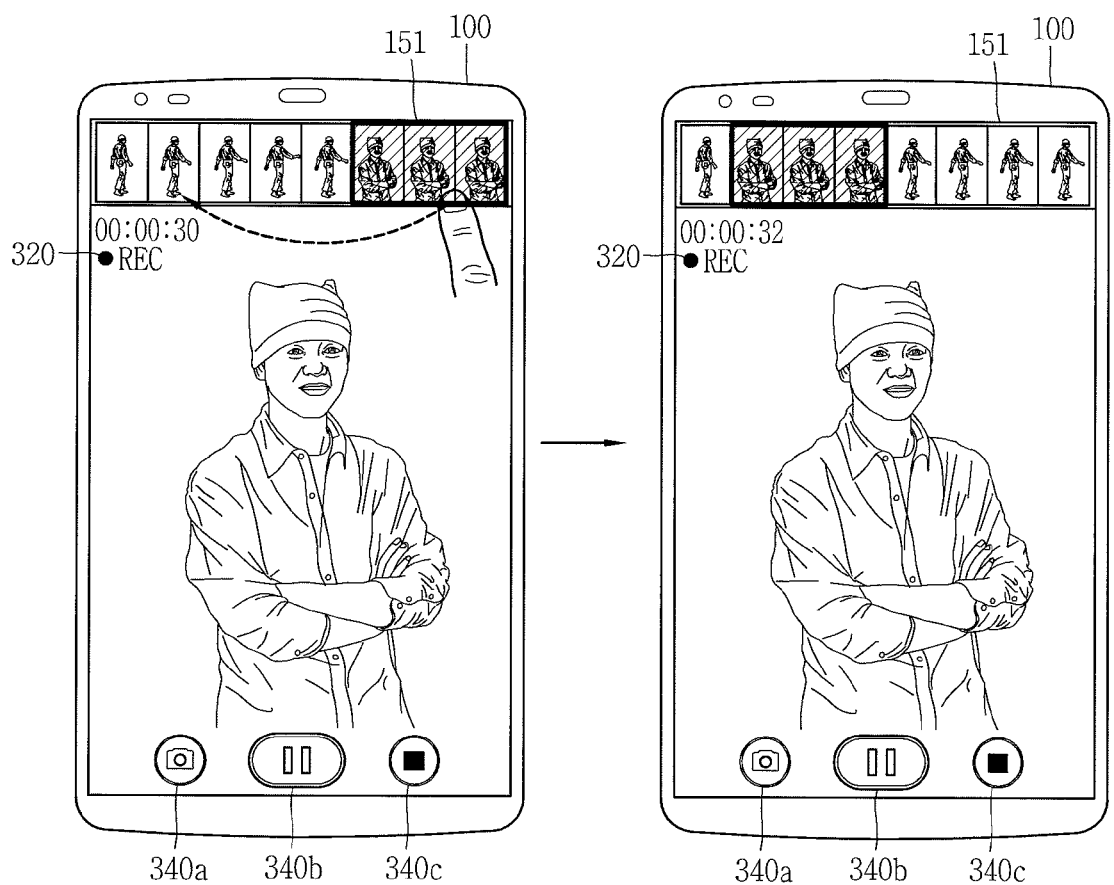
Figure 6C:
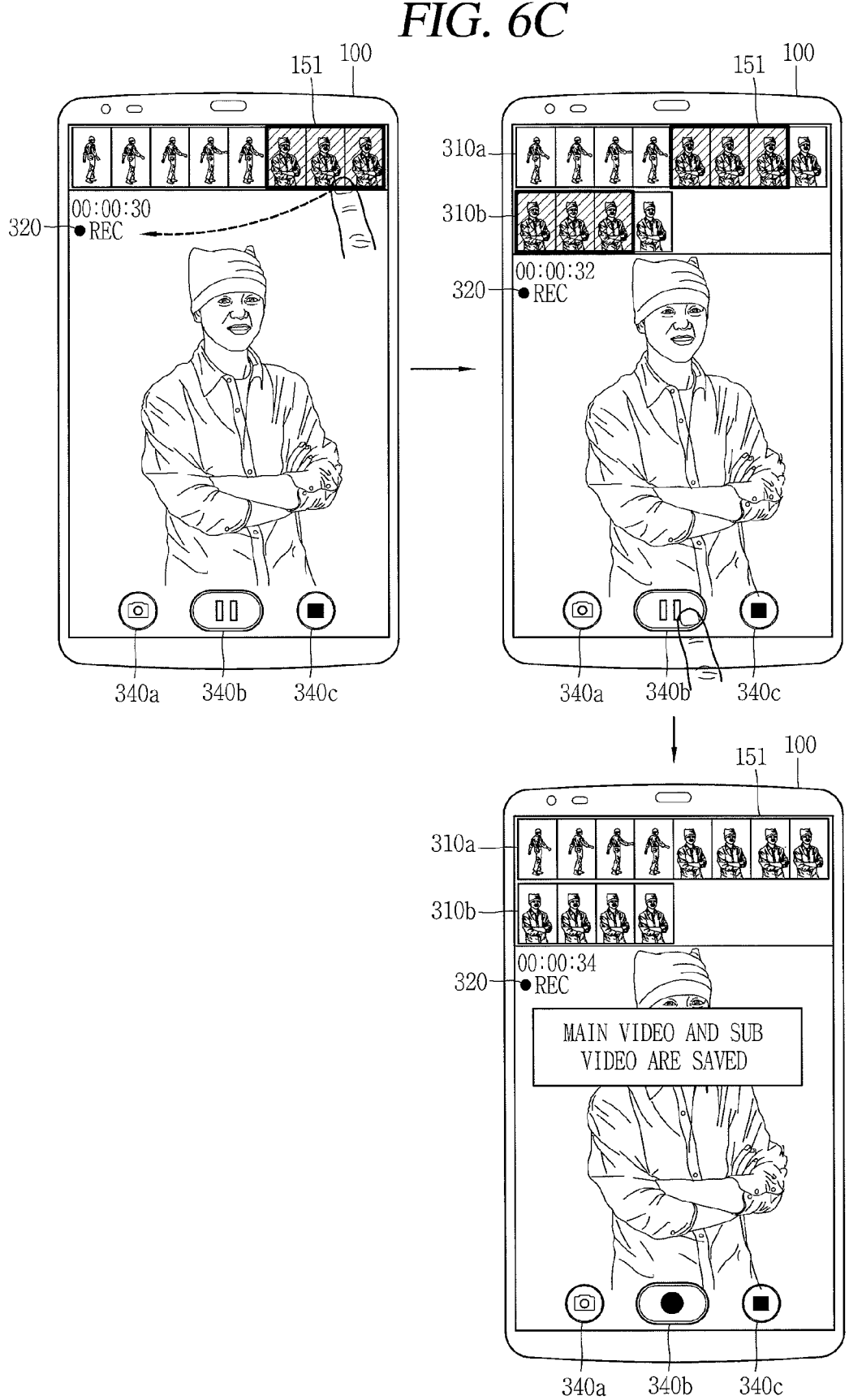

As shown in the second figure of FIG. 6A, the controller 180 informs that the one or more frames have been deleted, by removing the highlighted frames from the display 151. As another example, when the controller 180 generates a video using the generated frames, the controller 180 can change playback times of one or more of the generated frames. In more detail, as shown in the first figure of FIG. 6B, when a touch applied to the highlighted frames is moved left and then released at any one point of the frame display region 310, the controller 180 changes playback times of the one or more frames to be earlier than their original times.

Unlike this, when a touch applied to the highlighted frames is moved right and then released at any one point of the frame display region 310, the controller 180 changes playback times of the one or more frames to be later than their original times. As shown in the second figure of FIG. 6B, the controller 180 informs that the playback times of the one or more frames have been changed, by changing display positions of the highlighted frames.

As another example, the controller 180 can enable the main video and the sub video to be captured together. In more detail, when a touch applied to the highlighted frames is moved out of the frame display region 310, as shown in the first figure of FIG. 6C, the controller 180 displays a first frame display region 310a and a second frame display region 301b on the display 151, as shown in the second figure of FIG. 6C.

The first frame display region 310a is the same as a frame display region that has already displayed on the display 151. The second frame display region 310b is a newly generated region, independently of the first frame display region 310a. The highlighted frames are displayed in the second frame display region 310b. The controller 180 controls the display 151 to display at least some of frames, which are generated after the second frame display region 310b is displayed, in the first and second frame display regions.

When the camera finishes capturing the image after the second frame display region 310b is generated, as show in the third figure of FIG. 6C, the controller 180 saves the main video and the sub video. In this instance, the main video is a video including frames displayed in the first frame display region 310a, and the sub video is a video including frames displayed in the second frame display region 310b.

Thus, the user can additionally capture a video including some of the previously captured images while the camera captures an image. As discussed above, the mobile terminal according to an embodiment of the present invention can provide user convenience by executing the function associated with some of the previously captured images while the camera captures an image.

The predetermined condition used for the controller 180 to select one or more frames from among the generated frames will be discussed in detail below. In particular, FIGS. 7A to 7D are conceptual views showing an example of selecting frames that satisfy a predetermined condition. First, controller 180 recognizes a face from the generated frames. When a plurality of faces are recognized from the generated frames, the controller 180 controls the display 151 to output thumbnail images for the faces in order to inform the faces.

Figure 7A:
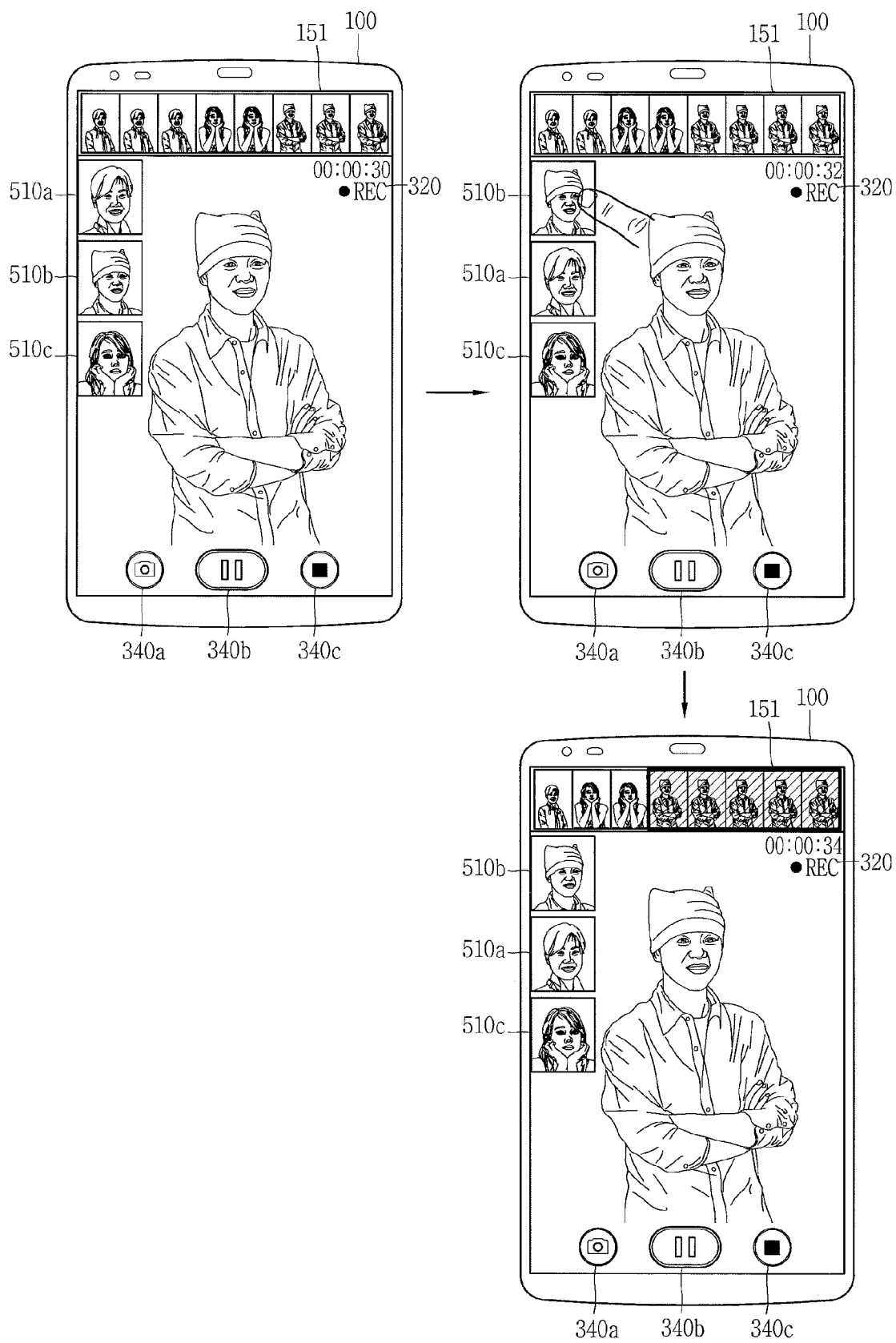
FIGS. 7A to 7D are conceptual views showing an example of selecting frames that satisfy a predetermined condition.

As shown in FIG. 7A, the controller 180 controls the display 151 to display thumbnail images of the faces recognized from the generated frames. The controller 180 controls the display 151 to change a size and a display position of one of the plurality of faces based on the number of times the face is recognized from the generated frames.

For example, as shown in the first figure of FIG. 7A, as the number of times a face is recognized from the created frames is greater, a thumbnail image of the face is displayed in an upper portion of the display 151. That is, among first to third thumbnail images 510a to 510c displayed on the displayed unit 151, a face corresponding to the first thumbnail image 510a, which is positioned at the top is a face that is recognized most frequently.

When the camera 121 continues to capture an image, new frames are generated. Thus, the types and frequencies of faces that are recognized from the generated frames may vary. When the types and frequencies of faces that are recognized from the generated frames vary, the controller 180 changes the thumbnail images displayed on the display in real-time.

For example, as shown in the second figure of FIG. 7A, frames including a face corresponding to the second thumbnail image 501b are additionally generated while the camera 121 captures an image. Thus, the second thumbnail image 510b is displayed at the top of the display 151, and the first thumbnail image 510a is displayed directly below the second thumbnail image 510b.

The controller 180 can select one or more frames based on a user input applied to a thumbnail image displayed on the display 151. For example, as shown in the third figure of FIG. 7A, when a touch is applied to the second thumbnail image 510b, the controller 180 selects one or more frames including a face corresponding to the second thumbnail image. In addition, the controller 180 highlights the frames including the face corresponding to the second thumbnail image 510b among the frames displayed on the display 151.

Next, the controller 180 selects one or more frames including a predetermined subject from among the generated frames. For example, as shown in the first figure of FIG. 7B, the controller 180 selects the predetermined subject based on the user input. As shown in the second figure of FIG. 7B, the controller 180 controls the display to display a graphic object informing about the selected subject. The graphic object 710 is displayed along with a real-time image 330 captured by the camera 121. When the selected subject is moved, the graphic object 701 also moves together.

Figure 7B:
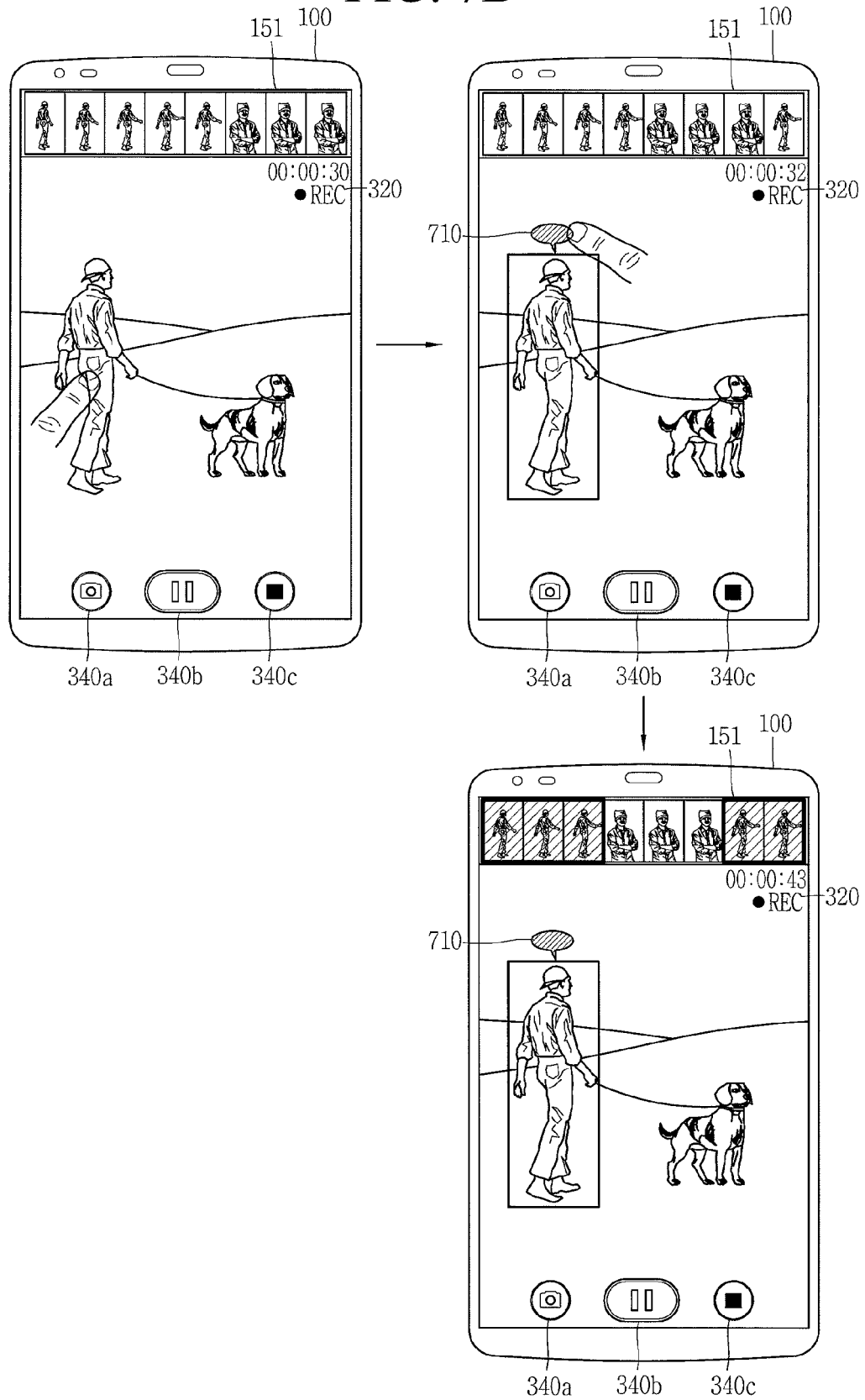
Figure 7C:
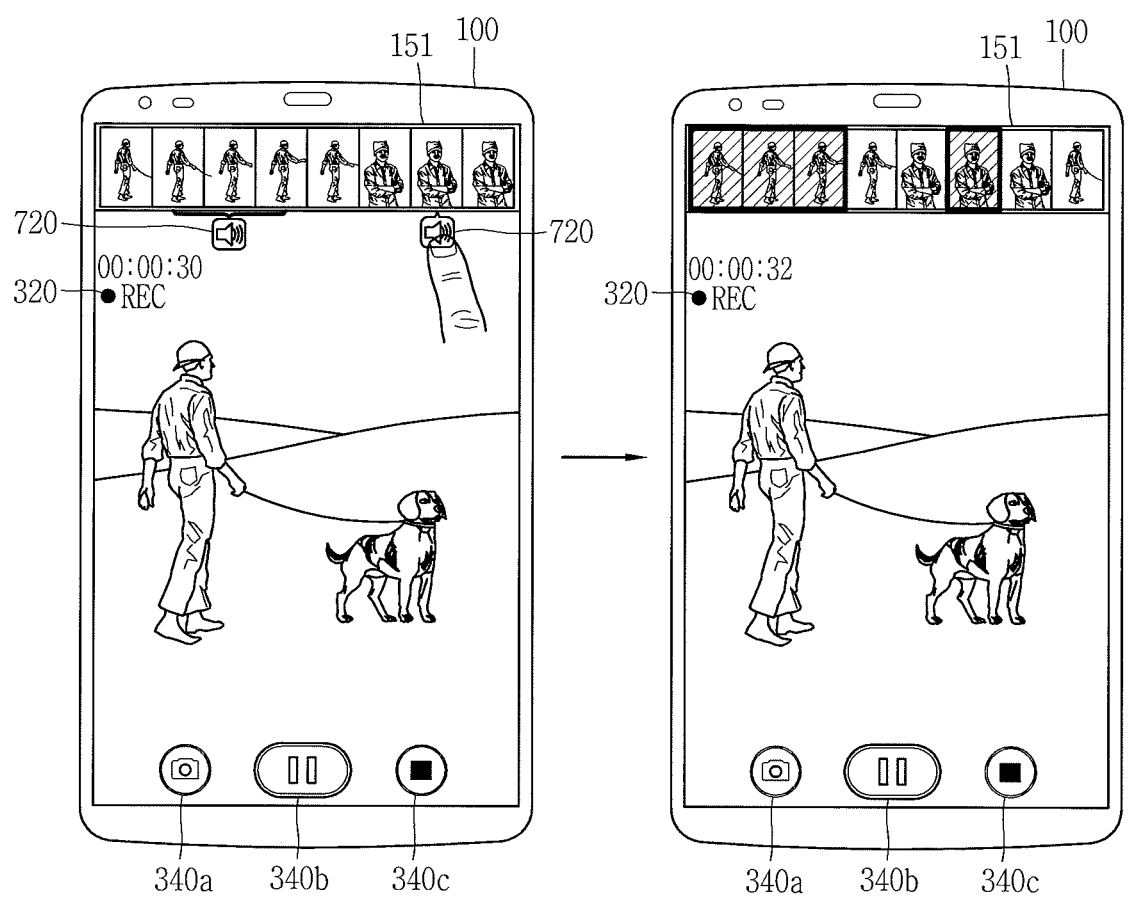

As shown in the third figure of FIG. 7B, when a touch is applied to the graphic object 710, the controller 180 selects one or more frames including the predetermined subject from among the generated frames. When new frames generated after the one or more frames are selected include the predetermined subject, the controller 180 also selects the new frames. In addition, the controller 180 highlights at least one frame including the predetermined subject among the frames displayed on the display 151.

Next, the controller 180 selects one or more frames including a recorded voice from among the generated frames. For example, as shown in the first figure of FIG. 7C, while the camera captures an image, the controller 180 controls the display 151 to output a graphic object 720 informing about the frame including the recorded voice. When a touch is applied to the graphic object 720 informing about the frame including the recorded voice, as shown in the second figure of FIG. 7C, the control unit selects one or more frames including the recorded voice from among the generated frames and processes at least one frame having the recorded voice among the frame displayed on the display 151.

In addition, the controller 180 selects one or more frames with similarity to a predetermined picture being equal to or greater than a reference ratio from among the generated frames. As shown in the first figure of FIG. 7D, while the camera 121 captures an image, the controller 180 can control the display 151 to output a selection window 730 for selecting a picture. The controller 180 selects a certain picture based on a user input applied to the selection window 730, and as shown in the second figure of FIG. 7, controls the display 151 to output a number indicating similarity between the picture and the generated frames.

Figure 7D:
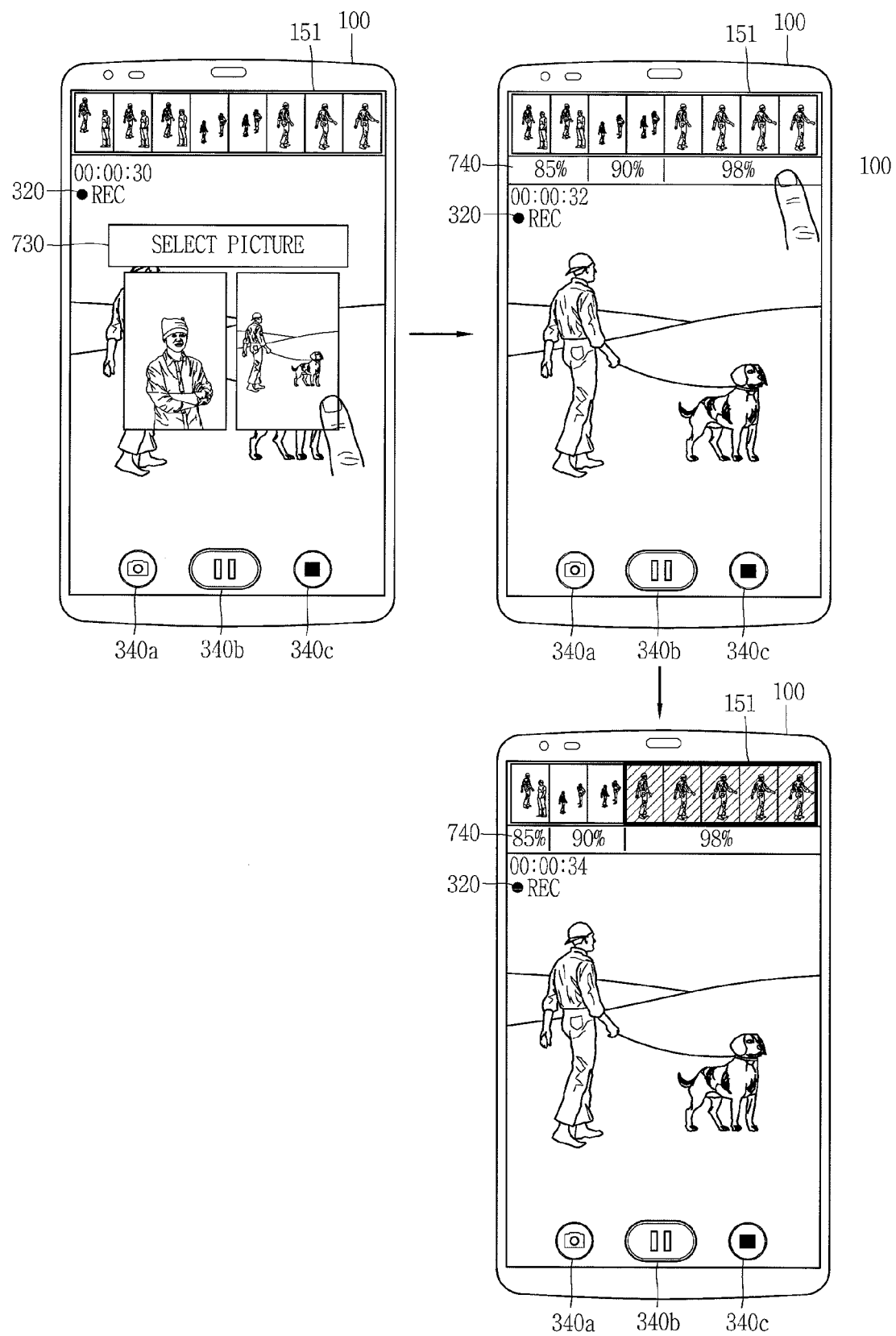

As shown in the third figure of FIG. 7D, the controller 180 sets the reference ratio based on a touch input applied to the number indicating the similarity between the picture and the generated frames, and selects one or more frames with similarity equal to or greater than the reference ratio from among the generated frames.

As discussed above, a mobile terminal according to an embodiment of the present invention can provide information regarding the previously captured images while the camera 121 captures an image. The user can utilize the information to select at least some of the previously captured images. The mobile terminal according to an embodiment of the present invention may execute various functions for providing user convenience while the camera captures an image. Functions that may be executed by the mobile terminal according to an embodiment of the present invention while the camera captures an image will be discussed below.

Figure 8:
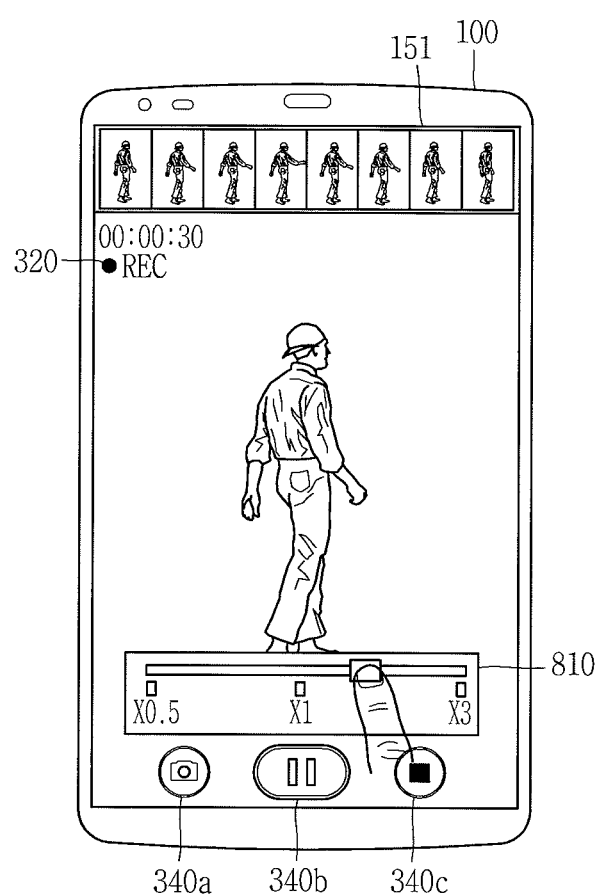
FIG. 8 is a conceptual view showing an example of changing the number of frames generated per unit time while a camera captures an image.

First, while the camera captures an image, the controller 180 can change the number of frames generated per unit time based on a user input. In particular, FIG. 8 is a conceptual view showing an example of changing the number of frames generated per unit time while a camera captures an image. When an image to be played back in slow-motion is captured, the controller 180 can implement a slow-motion image played back smoothly by increasing the number of frames generated per unit time.

In addition, when an image to be played back in fast-motion is captured, the controller 180 can minimize a capacity of a video file by decreasing the number of frames generated per unit time. That is, the controller 180 can change the number of frames generated per unit time while the camera 121 captures an image, based on a user input.

As shown in FIG. 8, while the camera 121 captures an image, a frame generation rate adjustment region 810 may be displayed on a portion of the display 151. The controller 180 can change the number of frames generated per unit time while the camera 121 captures an image based on a user input applied to the frame generation rate adjustment region 810.

Thus, while the camera 121 captures an image, the user can freely change the per-unit-time frame generation rate of the controller 180. Next, while the camera 121 captures an image, the controller 180 can divide the previously captured image into a background and a subject and play back the divided background and the divided subject at different rates.

Figure 9:
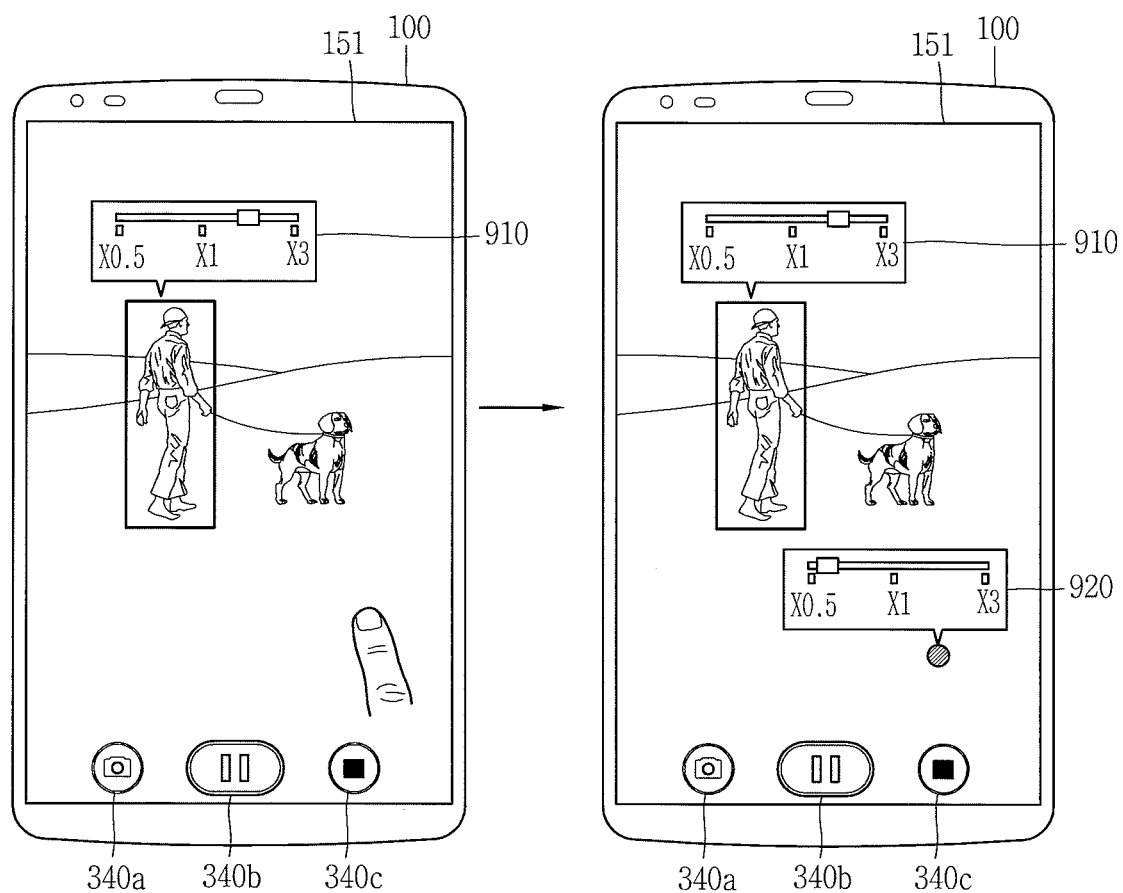
FIG. 9 is a conceptual view showing an example of separating a background and a subject from a previously captured image and playing back the separated background and subject at different playback rates.

FIG. 9 is a conceptual view showing an example of separating a background and a subject from a previously captured image and playing back the separated background and subject at different playback rates. As shown in FIG. 9, while the camera 121 captures an image, the controller 180 can separate the background and the subject and control the display 151 to output a first playback rate change window 910 for adjusting a playback rate of the separated subject.

When a user input is applied to the separated background while the first playback rate change window 910 is output, the controller 180 can control the display 151 to output a second playback change window 920 for changing a playback rate of the separated background. Also, the mobile terminal according to an embodiment of the present invention outputs a sub video generated while the camera 121 captures an image, together with the real-time image captured by the camera 121.

Figure 10:
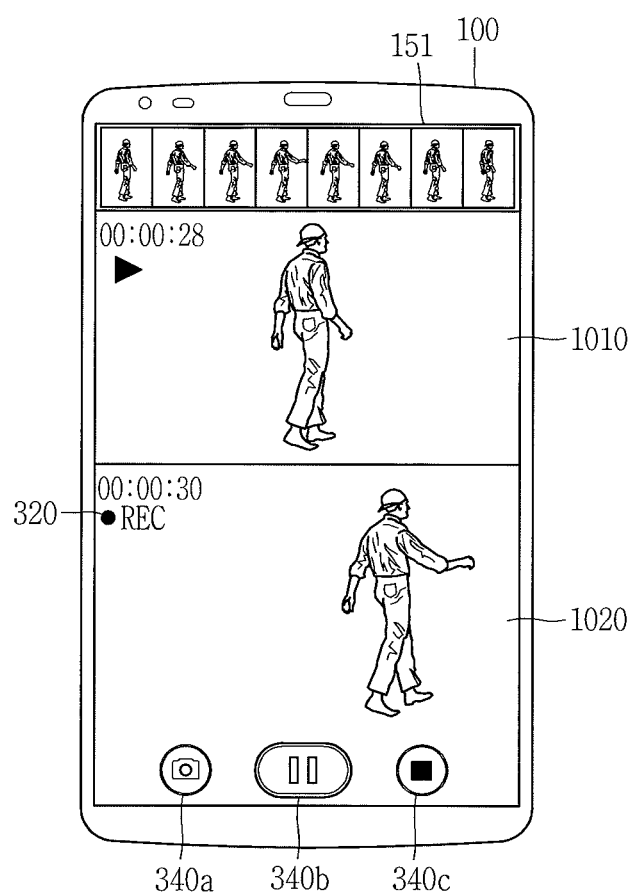
FIG. 10 is a conceptual view showing an example of outputting a sub video while a camera captures an image.

Next, FIG. 10 is a conceptual view showing an example of outputting a sub video while a camera captures an image. As shown in FIG. 10, while the camera 121 captures an image, the controller 180 divides a region in which a real-time image 330 captured by the camera 121 is output into a first region 1010 and a second region 1020. The sub video is output in the first region 1010, and the real-time image captured by the camera 121 is output in the second region 1020. Thus, even while the camera captures an image, the user can edit the previously captured images and check a result of the editing.

It is obvious to those skilled in the art that the present invention may be embodied in another specific form without departing from the spirit and scope of the present invention. Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a camera;
a display capable of display an image captured by the camera in real-time; and
a controller capable of:
display a plurality of frames generated using images captured continuously since a start of the image capturing, and
execute a function on the mobile terminal associated with one or more of the generated frames while the camera captures the image,
wherein the controller is further capable of:
generate a first video using all frames of the image captured at a first frame rate, and
generate a second video using the one or more frames at a second frame rate different from the first frame rate,
highlight at least one frame displayed on the display among the one or more frames to distinguish the highlighted frame from other frames,
display a size of the at least one frame differently according to the second frame rate, and
remove some of the displayed frames based on a change in size of the at least one frame.

2. The mobile terminal of claim 1, wherein the one or more frames are selected based on a touch input to the displayed plurality of frames.

3. The mobile terminal of claim 2, wherein the controller is further capable of:
set the second frame rate to be larger in response to the touch input being a pinch-in touch input, and
set the second frame rate to be smaller in response to the touch input being a pinch-out touch input.

4. The mobile terminal of claim 1, wherein the controller is further capable of:
display the first video on the display at the first frame rate, and
display the second video on the display at the second frame rate.

5. The mobile terminal of claim 1, wherein the controller is further capable of:
display a new frame that has not been displayed on the display among the generated frames, based on the change in size of the at least one frame.

6. The mobile terminal of claim 2, wherein the touch input includes a first touch on a first displayed frame and a second touch on a second displayed frame, and
wherein the controller is further capable of:
select first and second frames and frames between the first and second frames from among the displayed frames based on the first and second touches as the one or more generated frames.

7. The mobile terminal of claim 1, wherein the controller is further capable of:
continue to generate a natural number n of frames per unit time since the capture was started and change the number of frames generated per unit time from the natural number n to another natural number m in response to an input applied while the camera captures the image.

8. A mobile terminal comprising:
a camera;
a display capable of display an image captured by the camera in real-time; and
a controller capable of:
display a plurality of frames generated using images captured continuously since a start of the image capturing, and
execute a function on the mobile terminal associated with one or more of the generated frames while the camera captures the image,
wherein the controller is further capable of:
select one or more frames satisfying a predetermined condition from among the generated frames, and
highlight the one or more frames to distinguish the highlighted frames from other frames while the camera captures the image, and
wherein a frame satisfying the predetermined condition is a frame in which a predetermined face is recognized, a frame in which a predetermined subject is included, a frame in which a voice is recorded, or a frame with similarity to a predetermined picture being equal to or greater than a reference value.

9. The mobile terminal of claim 8, wherein the controller is further capable of:
generate a first video using all frames of the image captured at a first frame rate, generate a second video using the one or more frames at a second frame rate different from the first frame rate, and generate the first video as a main video using the generated frames and generate the second video as a sub video including the one or more frames while the camera captures the image, independently of the main video.

10. The mobile terminal of claim 9, further comprising: a wireless communication unit capable of transmit the sub video to another terminal.

11. The mobile terminal of claim 9, wherein, while the camera captures the image, the controller is further capable of display the sub video in a portion of the display.

12. The mobile terminal of claim 8, wherein the controller is further capable of display a thumbnail image of the recognized face on the display if the generated frames include at least one frame in which the predetermined face is recognized.

13. The mobile terminal of claim 12, wherein the controller is further capable of vary a size and a display position of the thumbnail image depending on a number of times the face is recognized from the generated frames.

14. The mobile terminal of claim 8, wherein the controller is further capable of display a graphic object informing about the frame satisfying the predetermined condition on the display if the generated frames include at least one frame in which the predetermined subject is included, in which the voice is recorded, or with similarity to the predetermined picture being equal to or greater than the reference value.

15. A method of controlling a mobile terminal, the method comprising:

displaying, via a display of the mobile terminal, an image captured by a camera in real-time;

displaying a plurality of frames on the display generated using images captured continuously since a start of the image capturing;

executing, via a controller of the mobile terminal, a function on the mobile terminal associated with one or more of the generated frames while the camera captures the image;

generating a first video using all frames of the image captured at a first frame rate;

generating a second video using the one or more frames at a second frame rate different from the first frame rate;

selecting one or more frames satisfying a predetermined condition from among the generated frames;

highlighting the one or more frames to distinguish the highlighted frames from other frames while the camera captures the image; and generating the first video as a main video using the generated frames and generate the second video as a sub video including the one or more frames while the camera captures the image, independently of the main video.

16. The method of claim 15, wherein the one or more frames are selected based on a touch input to the displayed plurality of frames, and wherein the second frame rate is set to be larger in response to the touch input being a pinch-in touch input, and the second frame rate is set to be smaller in response to the touch input being a pinch-out touch input.

* * * * *